US007334220B2

(12) United States Patent
Chang et al.

(10) Patent No.: US 7,334,220 B2
(45) Date of Patent: Feb. 19, 2008

(54) DATA DRIVEN TEST AUTOMATION OF WEB SITES AND WEB SERVICES

(75) Inventors: Ivy A. Chang, Redmond, WA (US); Sudhakar S. Sannakkayala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/798,658

(22) Filed: Mar. 11, 2004

(65) Prior Publication Data

US 2005/0267976 A1 Dec. 1, 2005

(51) Int. Cl.
*G06F 9/44* (2006.01)
*G06F 15/173* (2006.01)

(52) U.S. Cl. ...................... 717/126; 717/135; 709/224

(58) Field of Classification Search ................ 717/131, 717/126

See application file for complete search history.

(56) References Cited

U.S. PATENT DOCUMENTS

| | | | | |
|---|---|---|---|---|
| 6,044,216 | A * | 3/2000 | Bhargava et al. | 717/114 |
| 6,044,398 | A * | 3/2000 | Marullo et al. | 709/219 |
| 6,052,730 | A * | 4/2000 | Felciano et al. | 709/225 |
| 6,101,510 | A * | 8/2000 | Stone et al. | 715/513 |
| 6,138,157 | A * | 10/2000 | Welter et al. | 709/224 |
| 6,615,259 | B1 | 9/2003 | Nguyen et al. | |
| 6,654,699 | B2 | 11/2003 | Millard | |
| 6,671,723 | B2 | 12/2003 | Nguyen et al. | |
| 6,826,716 | B2 * | 11/2004 | Mason | 714/38 |
| 7,054,881 | B2 * | 5/2006 | Arcand et al. | 707/102 |
| 2002/0129059 | A1 * | 9/2002 | Eck | 707/513 |
| 2003/0229503 | A1 * | 12/2003 | Dan et al. | 705/1 |
| 2004/0107415 | A1 * | 6/2004 | Melamed et al. | 717/124 |
| 2004/0167749 | A1 * | 8/2004 | Friedman et al. | 702/186 |
| 2005/0234993 | A1 * | 10/2005 | Ordille et al. | 707/104.1 |

OTHER PUBLICATIONS

Tsai, W.T.; Paul, R.; Weiwei Song; Zhibin Cao; "Coyote: an XML-based framework for Web services testing", High Assurance Systems Engineering, 2002. Proceedings. 7th IEEE International Symposium on, Oct. 23-25, 2002 pp. 173-174, Digital Object Identifier 10.1109/HASE.2002.1173120.*

Elbaum, S.; Karre, S.; Rothermel, G.; "Improving web application testing with user session data" Software Engineering, 2003. Proceedings. 25th International Conference on, May 3-10, 2003 pp. 49-59, Digital Object Identifier 10.1109/ICSE.2003.1201187.*

Kotadia, "Microsoft's Passport to Doom" May 14, 2003, ZDNet News, accessed Jun. 6, 2007 at <http://news.zdnet.com/2100-9595_22-1001443.html>.*

(Continued)

*Primary Examiner*—Tuan Dam
*Assistant Examiner*—J. Derek Rutten
(74) *Attorney, Agent, or Firm*—Senniger Powers

(57) ABSTRACT

A system, method and data structure for testing a web location including a web site or web service. A test generator or user generates an XML test case and a driver interprets the XML test case into an http request to be sent to the web location as a test.

35 Claims, 10 Drawing Sheets

OTHER PUBLICATIONS

Mick, "Upload file via web form" Mar. 8, 2003, <mail.python.org>, accessed Jun. 4, 2007 at <http://mail.python.org/pipermail/python-list/2003-March/193458.html>.*

Ley, "Using the XML HTTP Request object", Aug. 3, 2002, <www.jibbering.com>, Archived Aug. 3, 2002 and accessed Jun. 4, 2007 at <http://web.archive.org/web/20020803103726/http://www.jibbering.com/2002/4/httprequest.html>.*

"Introduction to SOAP", Aug. 31, 2000, <www.w3schools.com>, Archived Aug. 31, 2000 and accessed Jun. 4, 2007 at <http://web.archive.org/web/20000831045627/http://www.w3schools.com/soap/soap_intro.asp>.*

Lucca et al., "Testing Web Applications", 2002, IEEE, Proceedings of the International Conference on Software Maintenance (ICSM'02), pp. 310-319.*

* cited by examiner

SEQUENCE OF REQUEST/RESPONSE PAIRS:

REQUEST/RESPONSE PAIR1

DATA STRUCTURE REPRESENTING REQUEST:

HTTP VERB:
  GET

URI/PATH/QUERY STRING PARAMETERS:
  HTTP://REGISTER.PASSPORT.NET/
  REG.SRF?SL=1

BODY:

HEADER:
  COOKIE: BROWSERTEST=SUCCESS?

DATA STRUCTURE REPRESENTING RESPONSE:

DATA TO VALIDATE:
  STATUSCODE=200

DATA TO STORE:
  GET "PPTPROF" FROM BODY

REQUEST/RESPONSE PAIR2

DATA STRUCTURE REPRESENTING REQUEST:

HTTP VERB:
  GET

URI/PATH/QUERY STRING PARAMETERS:
  HTTP://REGISTER.PASSPORT.NET/
  HIP.SRF?NS=PASSPORT.CO
  M&INT=REG

BODY:

HEADER:

DATA STRUCTURE REPRESENTING RESPONSE:

DATA TO VALIDATE:
  STATUSCODE=200
  COOKIES:
    HIPIMAGECHALLENGE
    HIPIMAGESOLUTION

DATA TO STORE:
  GET "HIPIMAGESOLUTION" FROM SET-COOKIE HEADER

REQUEST/RESPONSE PAIR3

DATA STRUCTURE REPRESENTING REQUEST:

HTTP VERB:
  POST

URI/PATH/QUERY STRING PARAMETERS:
  HTTPS://REGISTER.PASSPORT.NET/REG.SRF?SL=1&LC=1033

BODY: SIGNINNAME=USER@PASSPORT.COM&PASSWORD=PASSWORD&CONFIRMEDPASSWORD=PASSWORD&SECRETQUESTION=FAVORITE+PET'S+NAME?&SECRETANSWER=ROVER&PPTPROF=(PPTPROF)&HIPIMAGESOLUTION=(HIPIMAGESOLUTION)

HEADER: COOKIE:BROWSERTEST=SUCCESS?

DATA STRUCTURE REPRESENTING RESPONSE:

DATA TO VALIDATE:
  STATUSCODE=302
  COOKIES:
    MSPAUTH
    MSPPROF
    MSPSEC

DATA TO STORE:

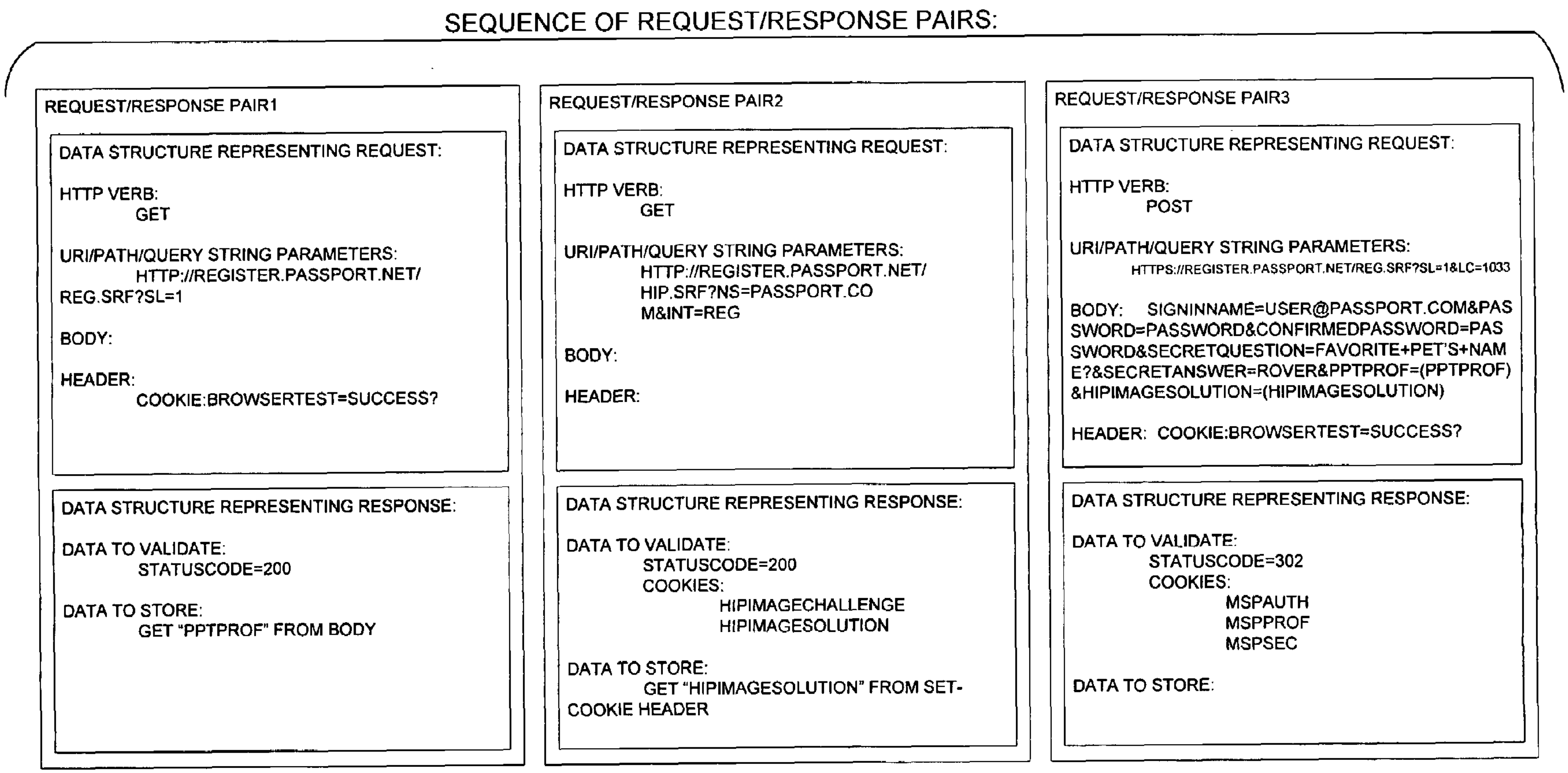

FIG. 3A

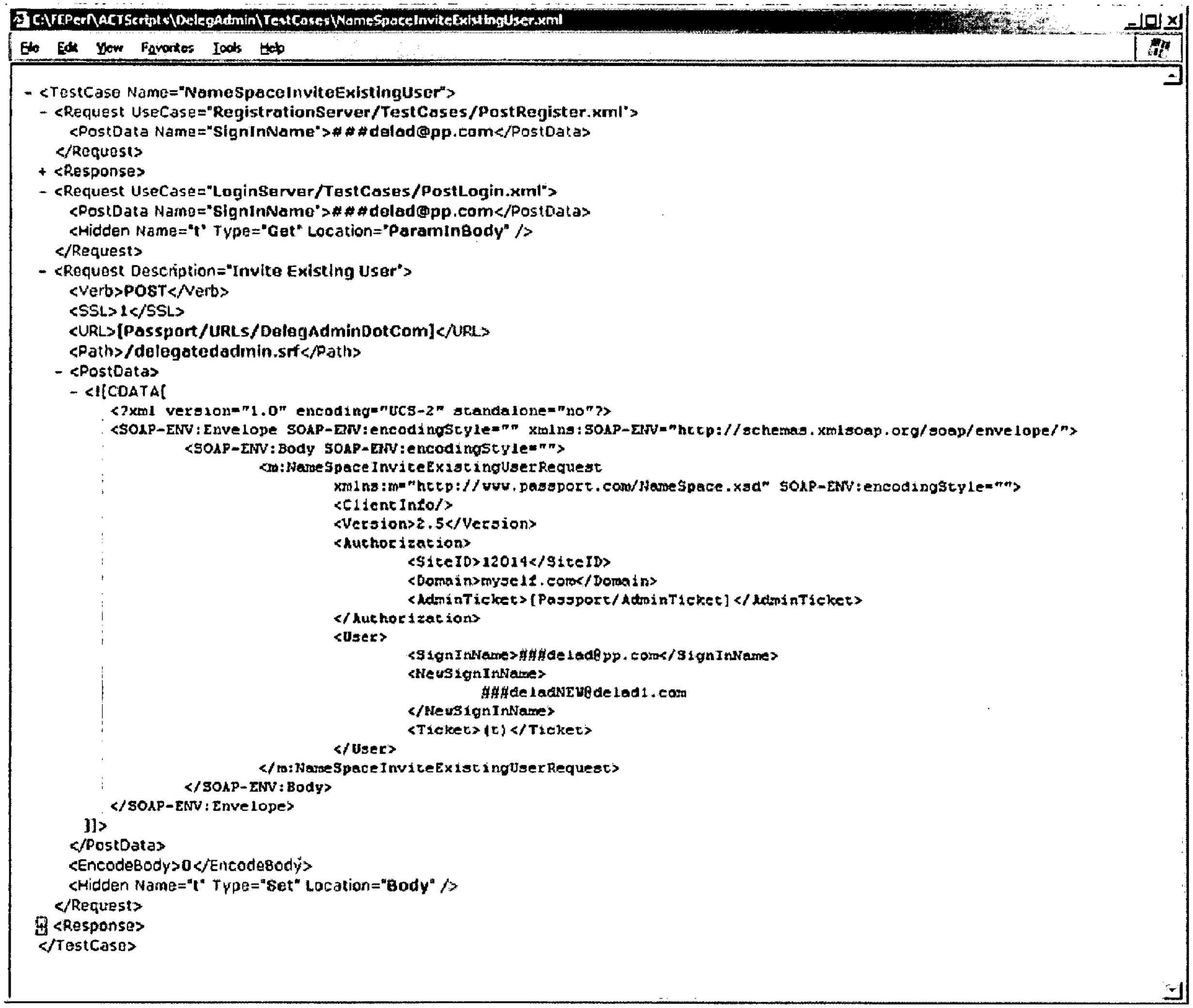

```
C:\FEPerf\ACTScripts\DelegAdmin\TestCases\NameSpaceInviteExistingUser.xml
File Edit View Favorites Tools Help

- <TestCase Name="NameSpaceInviteExistingUser">
  - <Request UseCase="RegistrationServer/TestCases/PostRegister.xml">
      <PostData Name="SignInName">###delad@pp.com</PostData>
    </Request>
  + <Response>
  - <Request UseCase="LoginServer/TestCases/PostLogin.xml">
      <PostData Name="SignInName">###delad@pp.com</PostData>
      <Hidden Name="t" Type="Get" Location="ParamInBody" />
    </Request>
  - <Request Description="Invite Existing User">
      <Verb>POST</Verb>
      <SSL>1</SSL>
      <URL>[Passport/URLs/DelegAdminDotCom]</URL>
      <Path>/delegatedadmin.srf</Path>
    - <PostData>
      - <![CDATA[
          <?xml version="1.0" encoding="UCS-2" standalone="no"?>
          <SOAP-ENV:Envelope SOAP-ENV:encodingStyle="" xmlns:SOAP-ENV="http://schemas.xmlsoap.org/soap/envelope/">
                  <SOAP-ENV:Body SOAP-ENV:encodingStyle="">
                          <m:NameSpaceInviteExistingUserRequest
                                  xmlns:m="http://www.passport.com/NameSpace.xsd" SOAP-ENV:encodingStyle="">
                                  <ClientInfo/>
                                  <Version>2.5</Version>
                                  <Authorization>
                                          <SiteID>12014</SiteID>
                                          <Domain>myself.com</Domain>
                                          <AdminTicket>[Passport/AdminTicket]</AdminTicket>
                                  </Authorization>
                                  <User>
                                          <SignInName>###delad@pp.com</SignInName>
                                          <NewSignInName>
                                                  ###deladNEW@delad1.com
                                          </NewSignInName>
                                          <Ticket>(t)</Ticket>
                                  </User>
                          </m:NameSpaceInviteExistingUserRequest>
                  </SOAP-ENV:Body>
          </SOAP-ENV:Envelope>
        ]]>
      </PostData>
      <EncodeBody>0</EncodeBody>
      <Hidden Name="t" Type="Set" Location="Body" />
    </Request>
  + <Response>
  </TestCase>
```

FIG. 7

DATA DRIVEN TEST AUTOMATION OF WEB SITES AND WEB SERVICES

TECHNICAL FIELD

Embodiments of the invention generally relate to the field of web service and web test automation tools. In particular, embodiments of this invention relate to a system, method and structure involving http (the hypertext transfer protocol) requests that are represented in XML format and sent to a web service and/or website for testing purposes.

BACKGROUND OF THE INVENTION

Currently, test automation for web sites and for web services is based on using a number of tools requiring test engineers to write automation that has to be either interpreted or compiled. As a result, the addition of new test cases becomes a labor intensive task that involves writing and modifying test code. Accordingly, a system, method and structure is desired which employs a data driven approach to generating an http request, thus facilitating web site and/or web service testing and addressing one or more of these and other disadvantages.

SUMMARY OF THE INVENTION

Embodiments of the invention solve this problem and others by providing a testing system and method allowing test cases to be added without having to modify or add any additional test code. According to one aspect of the invention, test automation of web sites and services is enabled in a data driven manner in the form of XML. As a result, the invention can be applicable to test any web site or web service on the internet. There is also an additional advantage of combining existing industry standards (e.g., XML) in such testing methodologies.

In an embodiment, the invention allows sending http requests to a web server in a data driven fashion without the addition of additional code.

In accordance with one aspect of the invention, a system provides for testing a web location including a web site or web service. A test generator generates an XML test case. A driver interprets the XML test case into an http request to be sent to the web location.

In accordance with another aspect of the invention, a method provides for testing a web location including a web site or web service comprising generating a test case in XML format and interpreting the XML test case into a http request to be sent to the web location.

In accordance with another aspect of the invention, a data structure is provided for an XML test case for use by a driver for interpreting the XML test case into an http request to be sent to a web location including a web site or a web service. The data structure comprises elements of an http request including the following: URL, path, query string parameters, post data, and verb.

In accordance with another aspect of the invention, a method is provided for testing a plurality of web locations connected by a multi-site user authentication system according to an XML test case comprising generating a specific XML test case associated with the web locations, parsing the XML test case into a sequence of request/response pairs, and sending each of the http requests to the corresponding web locations.

In accordance with another aspect of the invention, a computer readable medium (CRM) is provided having instructions for testing a web location including a web site or web service. The CRM includes instructions for generating an XML test case and instructions for interpreting the XML test case into an http request to be sent to the web location.

Alternatively, the invention may comprise various other methods and apparatuses.

Other features will be in part apparent and in part pointed out hereinafter.

BRIEF DESCRIPTION OF THE DRAWINGS AND APPENDIX

FIG. 3A illustrates a sequence of request/response pairs.

FIG. 7 is a screen shot of an example of a test case XML exposing the features supported by the methodology of one embodiment of the invention.

Figure 1:
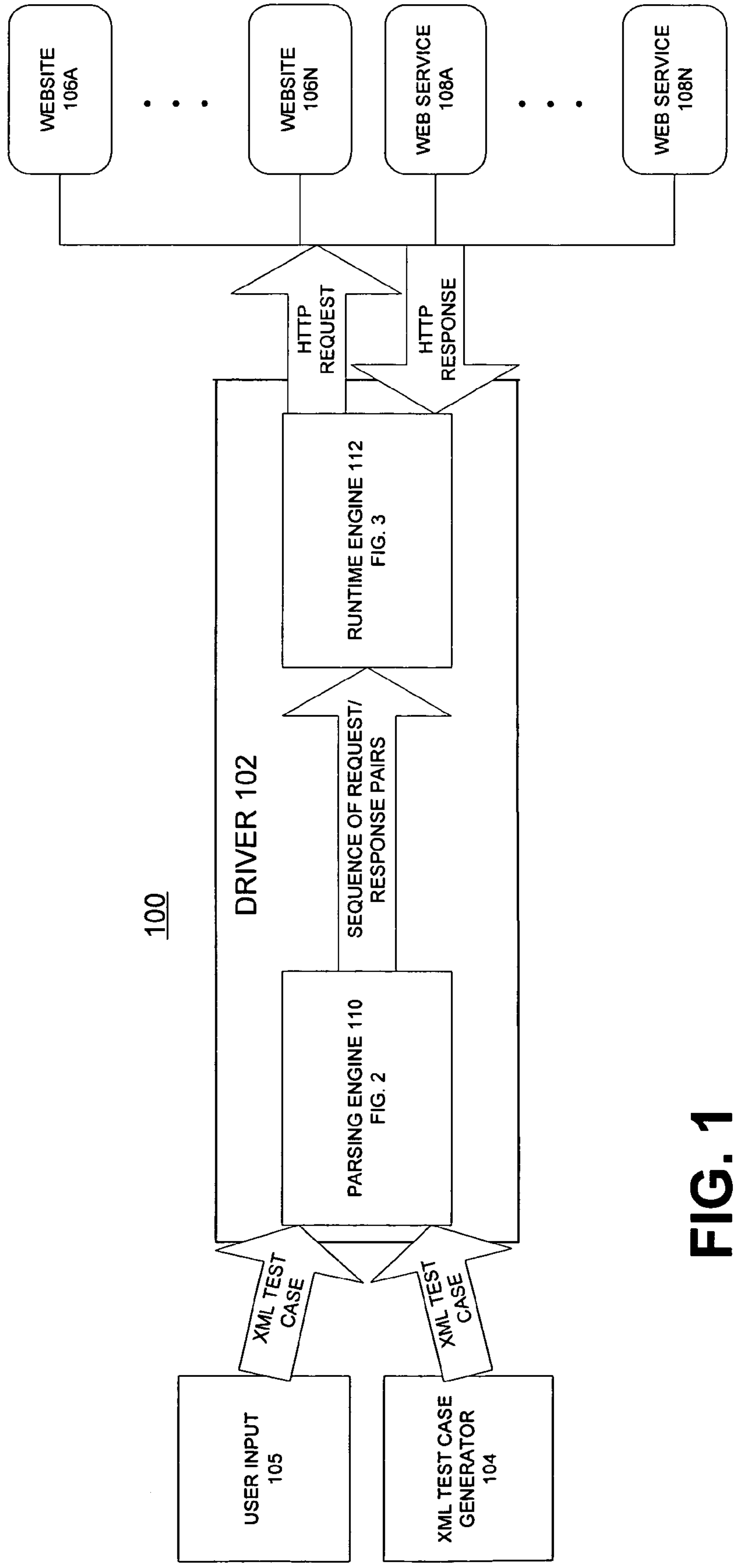
FIG. 1 is an exemplary embodiment in block diagram form of a system according to the invention.

The APPENDIX illustrates an embodiment of the invention applicable to testing a multi-site user authentication systems (e.g., Microsoft®.NET™ Passport single sign-in service).

Corresponding reference characters indicate corresponding parts throughout the drawings.

DETAILED DESCRIPTION OF THE INVENTION

Referring first to FIG. 1, an exemplary embodiment in block diagram form of a system 100 according to the invention is illustrated. A driver program 102, which may be implemented on a computer readable medium, includes instructions for interpreting a test case in the form of XML provided by XML test case generator 104 or generated manually by the user 105. The driver program 102 sends this interpreted XML test case as an http request to a particular web site 106A-106N and/or to a particular web service 108A-108N. Web sites 106A-106N and web services 108A-108N are herein referred to collectively as web locations. In one embodiment, the web locations may be part of a multi-site user authentication system.

The driver program 102 includes a parsing engine 110, shown in more detail and described below with regard to FIG. 2, and a runtime engine 112, shown in more detail and described below with regard to FIG. 3. Generator 104 or user input 105 provides the XML test case to parsing engine 110 of driver 102. The parsing engine 110 parses the XML test case into a sequence of request/response pairs as illustrated in FIG. 3A. The resulting request/response pairs are provided to the runtime engine 112 which converts the request portion of the request/response pairs into an http request to be sent to one of the web locations 106/108. The runtime engine 112 receives the corresponding http response from the web locations 106/108. It then validates the http response against the response portion of the request/response pair and retrieves and stores the data as specified in the response portion of the request/response pair.

In an embodiment, the invention includes a method of testing a plurality of web locations 106/108. A specific XML test case associated with the web locations 106/108 is generated by generator 104 or user input 105. The XML test case is parsed by parsing engine 110 into a sequence of request/response pairs. For each request/response pair, an http request is then sent by the runtime engine 112 to the specific associated web locations 106/108. An http response corresponding to the http request is then received from each of the web locations 106/108. Data in the received http response is retrieved, validated, and/or stored. The data received from each web location 106/108 is indicative of an operational status of the respective web location.

Figure 2:
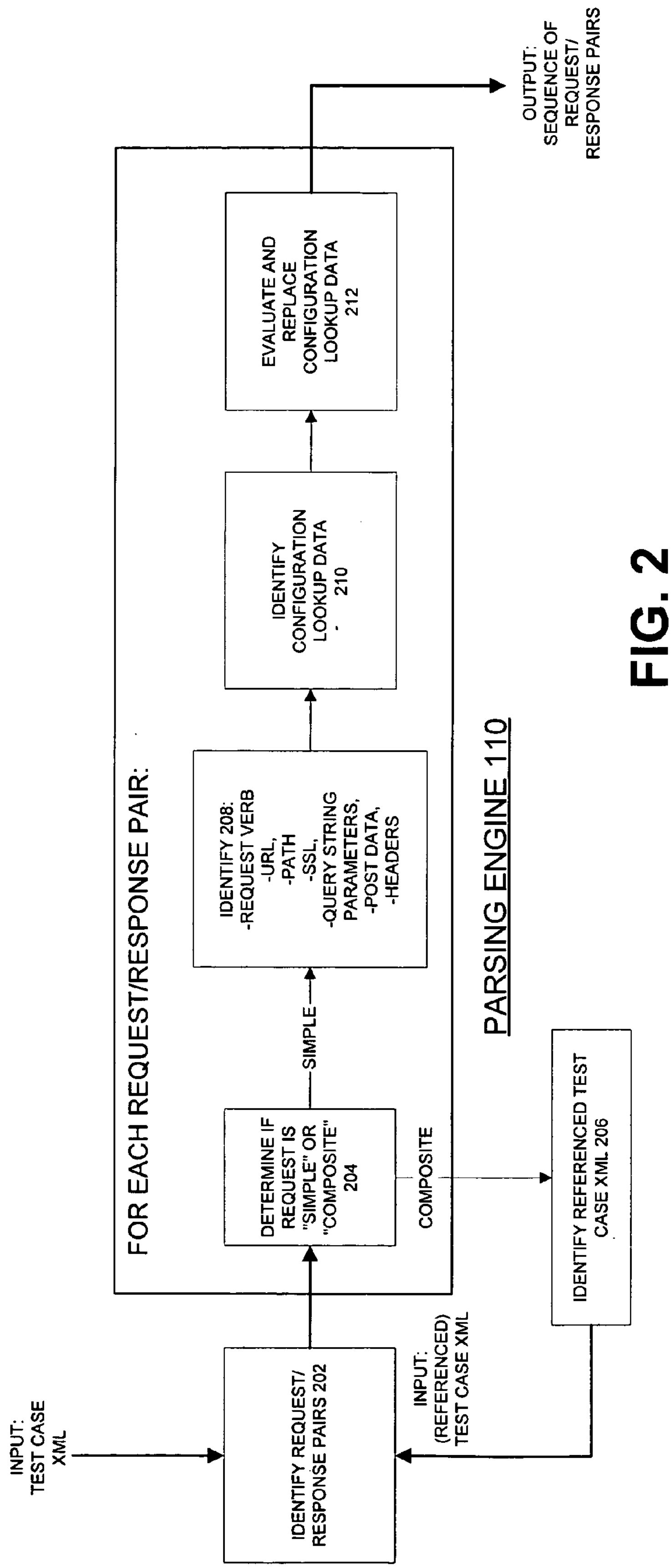
FIG. 2 is an exemplary embodiment in block diagram form of a parsing engine according to the invention.

Referring to FIG. 2, an exemplary embodiment in block diagram form of the parsing engine 110 according to the invention is illustrated. The parsing engine 110, which may be implemented on a computer readable medium, includes instructions 202 for identifying components in the XML test case received from the generator 104 or user 105 (see FIG. 1) and, in particular, the sequence of requests/response pairs. For each request, instructions 204 determine if the request is a simple request or a composite of other requests. If the request is a composite request, the process returns to instructions 206 to identify the referenced test case XML which is again evaluated by instructions 202. This return loop repeats itself until all requests are reduced to simple requests.

For each simple request or response pair, the process proceeds to instructions 208 to identify the data structure of the simple request/response pair. In one embodiment, the data structure used to represent a request comprises the elements of an http request such as URL, path, post data, query string data, http header, verb, etc. Thereafter, instructions 210 identify aspects of the request data structure which include configuration lookup data pertaining to the web location that needs to be tested. Instructions 212 evaluate and replace the identified configuration lookup data and output the resulting sequence of requests/response pairs.

Figure 3:
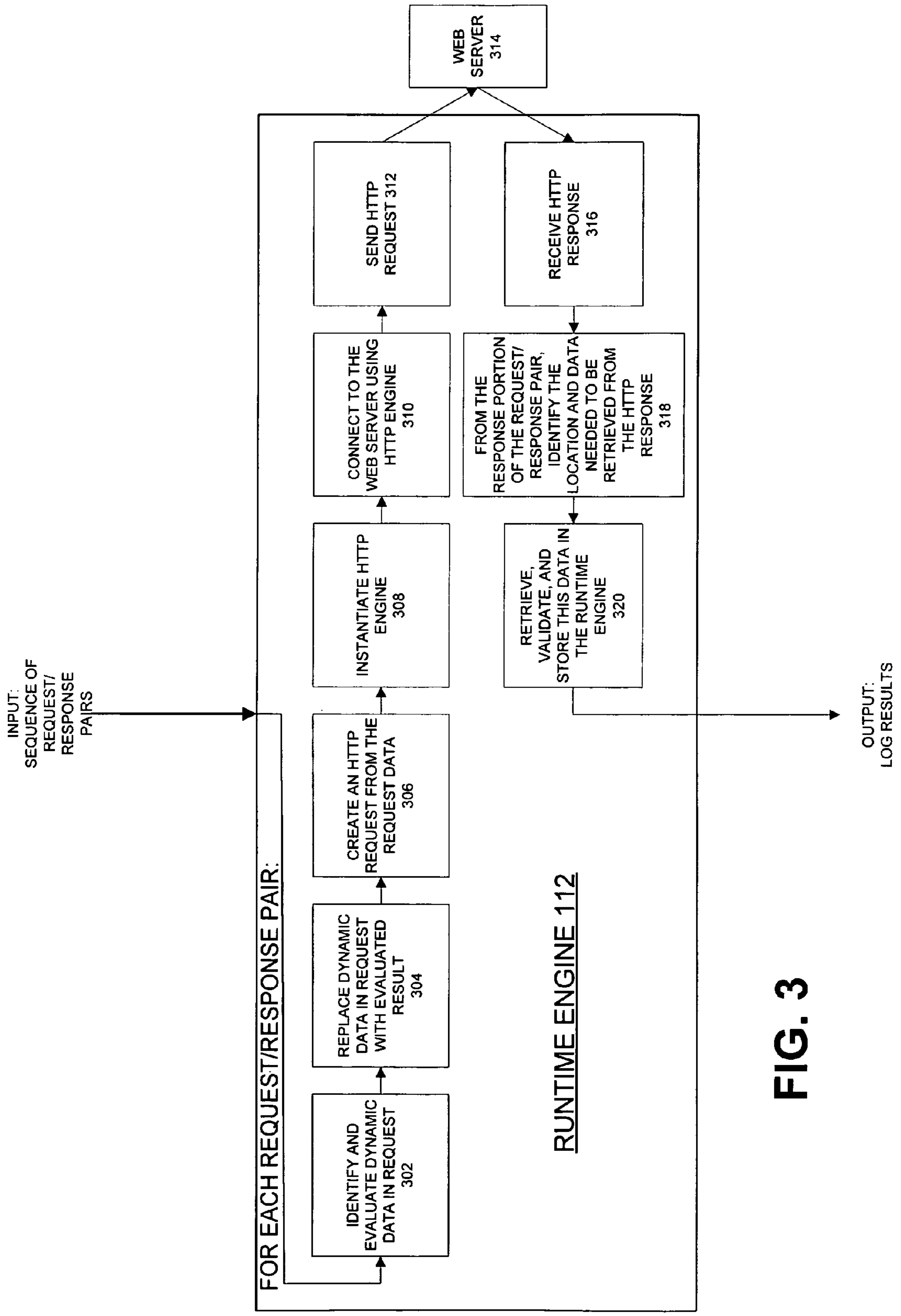
FIG. 3 is an exemplary embodiment in block diagram form of a runtime engine according to the invention.

Referring to FIG. 3, an exemplary embodiment in block diagram form of the runtime engine 112 according to the invention is illustrated. The runtime engine 112, which may be implemented on a computer readable medium, includes instructions 302 for identifying dynamic data in the request received from the parsing engine 110. Instructions 304 replace the identified dynamic data with an evaluated result. For example, this could be a randomly generated runtime value or a computed value from a COM object plug-in. After the dynamic data is replaced in the request, instructions 306 create an http request from the request data structure and instructions 308 instantiate the http engine. Next, instructions 310 instruct an http engine to connect to the web server 314 that is specified in the request. Instructions 312 send the http request to the identified web server 314.

The runtime engine 112 also includes instructions 316 for receiving from web server 314 an http response corresponding to the http request. Instructions 318 identify from the response portion of the request/response pair the location and data needed to be retrieved from the http response in order to evaluate the operability of the web location. Instructions 320 retrieve, validate, and store the identified data and provide them to a log.

The following describes the output of generator 104 or user input 105. In particular, EXAMPLE 1 is an example of XML metadata provided to test a web location according to an embodiment of the invention:

EXAMPLE 1

```
– <TestCase Name="PostLogin">
   – <RequestDescription="POSTLogin">
        <verb>POST</verb>
        <SSL>1</SSL>
        <URL>[Passport/URLs/LoginDotCom]</URL>
        <Path>/ppsecure/post.srf</Path>
        <QSParams Name="lc">1033</QSParams>
        <QSParams Name="id">[Passport/QSParams@Name=id]</QSParams>
        <QSParams Name="ru">http://
             [Passport/URLs/MemServDotNet]/memberservice.srf</QSParams>
        <QSParams Name="tw">20</QSParams>
        <QSParams Name="da">[Passport/QSParams@Name=da]</QSParams>
        <PostData Name="login">###@pp.com</PostData>
        <PostData Name="domain">[Passport/PostData@Name=domain]<PostData>
        <PostData Name="passwd">password</PostData>
        <PostData Name="sec" />
        <PostData Name="mspp__shared" />
        <Header Name="Cookie">BrowserTest=Success?</Header>
        <Header Name="Referer">https://[Passport/URLs/LoginDotCom]</Header>
   </Request>
<Response>
        <StatusCode>302</StatusCode>
        <Cookie Name="MSPAuth"/>
        <Cookie Name="MSPProf"/>
</Response>
</TestCase>
```

The driver program 102 interprets the above metadata and sends the http request to the web location. This methodology also supports construction of user scenarios by aggregating each of the above test cases. This helps the testers to simulate real world scenarios. The following EXAMPLE 2 is an example of such behavior:

EXAMPLE 2

```
– <Request UseCase="LoginServer/TestCases/PostLogin.xml">
    </Request>
    <Response>
        <StatusCode>302</StatusCode>
        <Hidden Name="t" Type="Get" Location="LocationHeader" />
        <Hidden Name="pt" Type="Get" Location="LocationHeader" />
    </Response>
– <Request Description="Get /regprofileaccrual.srf">
      <verb>GET</verb>
      <SSL>1</SSL>
      <URL>[Passport/URLs/RegDotNet]</URL>
      <path>/regprofileaccrual.srf</Path>
      <QSParams Name="lc">1033</QSParams>
      QSParams Name="id">10</QSParams>
      <QSParams Name="ns">[Passport/DomainName]</QSParams>
      <QSParams Name="t">(t)</QSParams>
      <QSParams Name="pt">(pt)</QSParams>
      <Hidden Name="t" Type="Set" Location="QueryString" />
      <Hidden Name="pt" Type="Set" Location="QueryString" />
  </Request>
  <Response>
        <StatusCode>200</StatusCode>
  </Response>
– <Request Description="Get /pp30/editprof.srf">
    <verb>GET</verb>
    <SSL>1</SSL>
    <URL>[Passport/URLs/RegDotNet]</URL>
    <Path>/pp30/editprof.srf</Path>
    <QSParams Name="id>10<QSParams>
    <QSParams Name="inframe">1</QSParams>
    <QSParams Name="cbid">10</QSParams>
    <QSParams Name="lc">1033</QSParams>
  </Request>
  <Response>
        <StatusCode>200</StatusCode>
        <Hidden Name="VERIFICATION_HASH" Type="Get" Location = "Body" />
        <Hidden Name="PPTProf" Type="Get" Location="Body" />
  </Response>
– <Request Description="POST Edit Profile Information">
    <verb>POST</verb>
      <SSL>1</SSL>
      <URL>[Passport/URLs/RegDotNet]</URL>
      <Path>/editprof.srf</Path>
      <QSParams Name="id">10</QSParams>
      <QSParams Name="inframe">1</QSParams>
      <QSParams Name="cbid">10</QSParams>
      <QSParams Name="lc">1033</QSParams>
      <PostData Name="FirstName">First</PostData>
      <PostData Name="LastName">Last</PostData>
      <PostData Name="UpdateCountry">false</PostData>
      <PostData Name="Country">US</PostData>
      <PostData Name="UpdateRegion">false<PostData>
      <PostData Name="Region">35841</PostData>
      <PostData Name="bPostalCode">98052</PostData>
      <PostData Name="UpdateLanguage">false</PostData>
      <PostData Name="LanguagePreference">1033</PostData>
      <PostData Name="TimeZone">1119</PostData>
      <PostData Name="Month">1</PostData>
      <PostData Name="Day">1</PostData>
      <PostData Name="Year">1980</PostData>
      <PostData Name="Gender">m</PostData>
      <PostData Name="Occupation">D</PostData>
      <PostData
Name="VERIFICATION_HASH">(VERIFICATION_HASH)</PostData>
      <PostData Name="PPTProf">(PPTProf)</PostData>
      <Hidden Name="VERIFICATION_HASH" Type="Set" Location="Body" />
      <Hidden Name="PPTProf" Type="Set" Location="Body" />
    </Request>
```

-continued

```
<Response>
    <StatusCode>302</StatusCode>
    <Cookie Name="MSPAuth" />
    <Cookie Name="MSPProf" />
</Response>
```

In the above example, the user scenario called EditProfile is constructed by using other test cases. The <Request UseCase> metadata tag supports this. This is similar to the "include file" programming construct in most programming languages. This methodology extends the concepts of "include files" into a data driven test automation model.

In addition to creating composite test cases and test scenarios, the methodology also supports static as well as dynamic data that is evaluated at runtime, giving the user more flexibility in terms of the data that is posted to the web location. The following are some of the aspects of this flexibility.

Usernames ###

Usernames are dynamically generated for test cases, so when ### is encountered, a new username is substituted as the parameter value. (i.e. ###="BaseName5379") as shown in EXAMPLE 1 above.

Cluster Configuration File Lookup

In some cases, the parameters are specific to the web location and must be retrieved from the configuration file corresponding to the web location. For instance, when the script encounters <URL>[Passport/URLs/LoginDotCom]</URL>, the actual URL can be determined by looking for the value of the path [Passport/URLs/LoginDotCom] in the corresponding configuration file.

Optional Tags

In addition to the tags above, optional tags can also be used in each Request element, e.g. <Delimiter/>, <PersistCookies/>, <UseCOMObject/>, <RedirectDepth/>, and <EncodeBody/>. The default values when these tags are omitted are: Delimiter=&; PersistCookies=1; UseCOMObject=0; RedirectDepth=0; and EncodeBody=1. "Delimiter" is the character that separates the parameters in the query string and post data. "PersistCookies" selects whether the stored cookies should be sent with that request and whether to store new cookies returned in the response (1=true, 0=false). "UseComObject" is used for test scenarios that require instantiating and calling a method in a COM object. "RedirectDepth" is the number of redirects that the runtime engine follows when it receives a redirect in the response. "EncodeBody" selects whether the data in the request body is URL encoded or not (1=true, 0=false).

Cookie Handling

The test automation uses its own cookie handling functions which mimic the behavior of the browser unless the <PersistCookies>0</PersistCookies> tag is used as described above.

Data Manipulation

Optionally, the response data that comes back from the web location may need to be converted into a different format before sending it back to the web server as part of the next request. As explained above with the <UseCOMObject> construct, the invention supports pluggable components to the XML schema. Users can plug in the result of a function call in a dll that supports the IDispatch COM interface.

XML Parameter Support

Some test cases may require parameter values in the form of XML tags. To support this, <QSParams/>, <PostData/>, and <Header/> tags without a "Name" attribute will add only the tag's value to the corresponding parameter. In addition, CDATA (an XML construct) is used to prevent any conflicts with characters in the value and the structuring of the test case XML file itself, e.g. <PostData> <![CDATA [<LoginName>MyName1000</LoginName>]]> </PostData>. Where XML parameters are used, the <EncodeBody>0</EncodeBody> tag should be used so the XML values are not URL encoded before being sent to the server.

Hidden Fields

Hidden fields or other parameters may be returned in a response body or header to be sent as part of the next request. In general, these are referred to as hidden fields. The <Hidden/> tag supports this by allowing the user to select which hidden fields to parse for in the response and which hidden fields to set in the subsequent request. EXAMPLE 3 is an example of HIPRegistration where the HIPImageSolution is grabbed from the response and sent as part of the PostData in the next request. The first request will have a "Hidden" tag with Type="Get".

EXAMPLE 3

```
<Request>
    ...
    <Hidden Name="HIPImageSolution" Type="Get"
    Location="SetCookieHeader" />
</Request>
```

The Set-Cookie header from the request's response is then parsed for "HIPImageSolution=HIDDENVALUE" and the name and value pair is stored in a hidden field array in memory. EXAMPLE 4 uses the hidden field value in a subsequent request.

EXAMPLE 4

```
<Request>
    ...
    <PostData Name="HIPSolution">(HIPImageSolution)</PostData>
    <Hidden Name="HIPImageSolution" Type="Set" Location="Body"
    />
</Request>
```

The hidden field array is searched for the hidden field named "HIPImageSolution", and its corresponding hidden field value replaces "(HIPImageSolution)" in the body of the request.

Other possible "Locations" for hidden fields of Type="Get" are:

"ResponseBody":
 Generically, the entire response body is returned as the hidden value;
"Body":
 Matches the string "<input type="hidden" name="HIDDENNAME" value="HIDDENVALUE">" in the response body;
"URLinBody":
 Matches the string "<A HREF="http://next-login.passporttest.com/login.srf?HIDDENNAME=HIDDENVALUE">" in the response body;
"ParamInBody":
 Matches the string "URL=http://site1.latestos.test.microsoft.com/default.asp?did=1&HIDDENNAME=HIDDENVALUE" in the body;
"NameValueInBody":
 Matches "HIDDENNAME=HIDDENVALUE" anywhere in the body;
"LocationHeader":
 Matches "HIDDENNAME=HIDDENVALUE" anywhere in the location header;
"SetCookieHeader":
 Matches "HIDDENNAME=HIDDENVALUE" anywhere in the Set-cookie header;
"LocationHeaderQS":
 Returns the entire query string from the location header's URL;
"BracesInBody":
 Matches and returns "{HIDDENVALUE}" anywhere in the body.

Possible "Locations" for hidden fields of Type="Set" are
"Body":
 The HIDDENVALUE replaces "(HIDDENNAME)" in the PostData;
"QueryString":
 The HIDDENVALUE replaces "(HIDDENNAME)" in the Query String Parameter;
"Header":
 The HIDDENVALUE replaces "(HIDDENNAME)" in the Header.

Random Parameter Values

Random values can also be inserted dynamically for any of the parameter values in the http request. The runtime engine 112 is responsible for randomly selecting such values from an XML data file. The following EXAMPLE 5 is an example XML data file containing possible values for the specified parameters.

EXAMPLE 5

```
- <Invalid>
  - <Data Name="Accessibility">
    - <Value Description="BadChars">
        <![CDATA[ * ]]>
      </Value>
    - <Value Desription="BadValue">
        <![CDATA[ -1 ]]>
      </Value>
    - <Value Description="Long">
        <![CDATA[ 10 ]]>
      </Value>
```

-continued

```
    - <Value Description="BadValue">
        <![CDATA[ 2 ]]>
      </Value>
    + <Value Description="BadValue">
    + <Value Description="Badchars">
    + <Value Description="BadChars">
    + <Value Description="Blank">
    </Data>
  + <Data Name="AltEmail">
  + <Data Name="BirthDateSilk">
  + <Data Name="BirthDate">
  + <Data Name="CardNumber">
  + <Data Name="CB">
  + <Data Name="CT">
  + <Data Name="City">
  + <Data Name="Country">
```

In a test case XML file, a tag value containing "{Data@Name="Accessibility"}" will be replaced randomly with any of the possible values listed under the <Data Name="Accessibility"> node in the XML data file of EXAMPLE 5.

Request "UseCase" Attribute

To further abstract the test case XML files, an entire set of existing test case requests may be inserted in a test case using the Request "UseCase" attribute. This is useful when one of the steps is a standard one such as performing a POST login. For instance, in EXAMPLE 6 for changing a password (ChangePwd), the first step is to perform a PostLogin.

EXAMPLE 6

```
- <TestCase Name="ChangePwd">
  - <Request UseCase="LoginServer\TestCases\PostLogin.xml">
      <QSParams Name="cbid">10</QSParams>
      <PostDaa Name="sec" />
      <PostData Name="mspp_shared" />
      <Hidden Name="t" Type="Get" Location="ParamInBody" />
      <Hidden Name="p" Type="Get" Location="ParamInBody" />
    </Request>
  + <Request Description="GET member services page (and.net cookies)">
  + <Request Description="POST New Password">
</TestCase>
```

When UseCase="LoginServer\TestCases\Post-Login.xml" is encountered in the first <Request> tag, the requests in PostLogin.xml are sent before the next Requests listed in ChangePwd.xml. Query string parameters, post data, headers, and hidden fields enclosed within this <Request UseCase=" "> tag override the original parameters in the referenced test case if they exist. If not, the extra parameters are appended. The UseCase attribute is also seen in EXAMPLE 2.

FIG. 7 is a screen shot of an example of a user scenario exposing the above features supported by the methodology of an embodiment of the invention.

Computer Architecture

Figure 8:
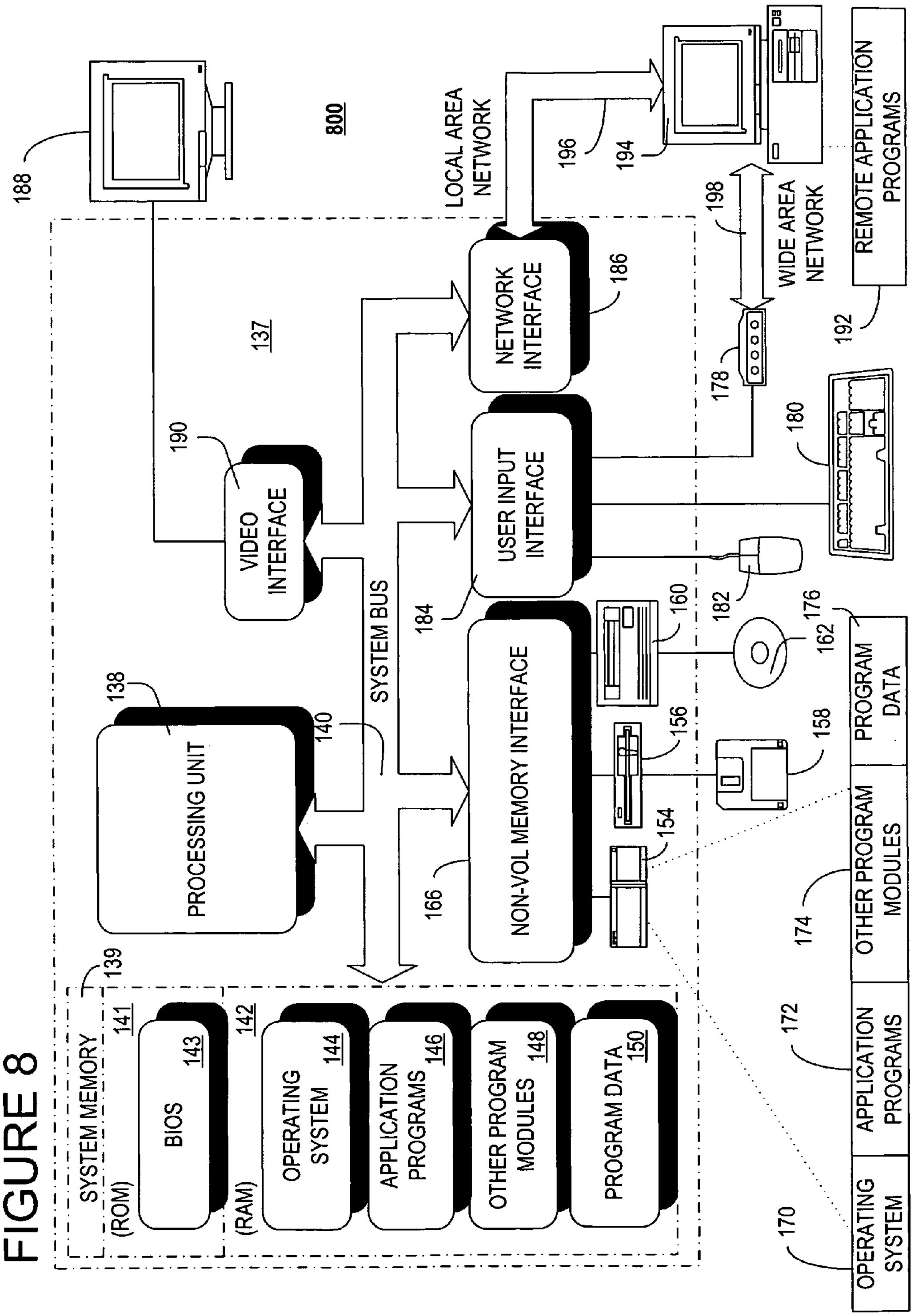
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in implementing the invention. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIGS. 2 and 3 to implement a method of testing a web location including a web site or web service comprising generating an XML test case and interpreting the XML test case into an http request to be sent to the web location. The executed method further includes parsing the XML test case into a sequence of requests and/or into response pairs and providing to the web location the http request corresponding to the sequence of requests or corresponding to the response pairs. As a result, an http response is received by the computer 130 from the web location corresponding to the http request and data in the http response is retrieved and stored to indicate an operational status of the web location.

The following example presented in the Appendix further illustrate the invention.

The order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Example Applicable to Testing Multi-site User Authentication Systems e.g., Microsoft® .NET™ Passport Single Sign-in Service

The following is an example of the application of the invention to multi-site user authentication systems (e.g., Microsoft® .NET™ Passport single sign-in service) specifically addressing front end performance and stress test automation.

VBScript

The scripts are developed in VBScript and abide by a few simple programming conventions based on the conventions used in the ACT (Application Center Test) sample code. This facilitates using any of the ACT Help files and re-using sample code.

sMyStringVariable
iMyIntegerVariable
aMyArray
oMyObject
bIsMyBooleanVariable
g_xMyGlobalVariable (where x is any of the above prefixes)
Const CONSTANT_NAME
MyFunctionName( )

WINDOWS® Script Host

The script engine "cscript" is available as part of the WINDOWS® installation, version 5.6 or higher.

XML

The test settings and test case parameters are stored in XML files which are parsed using the MSXML DOM component (which may include parsing and XML validation).

Basic Architecture

The basic architecture comprises VBScripts used within the ACT application and a set of XML files containing the test data and settings. This file distinction provides a level of separation between implementation and the data used in a test.

Test Settings XML

The "TestSettings.xml" file defines the high level test settings properties such as which Passport test web location and what usernames to use. These properties should be set prior to running a test. Since the usernames may need to be generated distinctly for different domain authorities, each domain authority has a separate set of user configurations, as illustrated in the following EXAMPLE 7:

EXAMPLE 7

```
– <TestSettings>
    <!-Longhaul, Test, SP, Brimstone, DevC, etc. -->
    <TestCluster>Test</TestCluster>
    <!-Number of iterations to run each test case (will be multiplied
    with number of iterations set in ACT properties) -->
    <TestCaseIterations>1000</TestCaseIterations>
    <!-0 to turn off Trace, 1 to turn on -->
    <Trace>1</Trace>
```

-continued

```
    <!-Generates full user randomly instead of sequentially
    (1=on, 0=off) -->
    <RandomUsers>1</RandomUsers>
  – <DA Name="Passport">
      <!-Base name for user -->
      <BaseName>ivypp</BaseName>
      <!-Suffix to UserName ranges anywhere from StateUser value -->
      <StartUser>1</StartUser>
      <!-to EndUser value -->
      <EndUser>1000</EndUser>
      <!-Value from 0–26, 0= No prefix, 26= UserPrefix
      anywhere from A–Z -->
      <UserPrefix>26</UserPrefix>
  </DA>
+ <DA Name="EASI">
+ <DA Name="MSN">
+ <DA Name="Hotmail">
</TestSettings>
```

"TestCluster" can be either "Longhaul", "Test", "SP", "Brimstone", "DevC", etc. "TestCaseIterations" is a positive value equaling the number of iterations to run a test. "Trace"=0 turns verbose trace statements in the ACT_*.log file off, "Trace"=1 turns verbose tracing on; A "RandomUsers" value of 1 signifies usernames are generated randomly within the StartUser and EndUser range (i.e. UserName1 . . . UserName10000) while "RandomUsers"=0 signifies usernames are generated sequentially within the same range. Usernames are formed from "BaseName" with an integer suffix as just described and a prefix value depending on "UserPrefix". "UserPrefix"=0 signifies that there is no prefix added, "UserPrefix"=1 prepends "A", "UserPrefix"=2 prepends any letter between A and B, "UserPrefix"=26 prepends any letter between A and Z, etc.

Cluster Configuration XML

For each Passport test web location there corresponds an XML configuration file. If the TestSettings.xml file has node <TestCluster>Betaprep</TestCluster>, there must be a corresponding Betaprep.xml file in the ACTScripts/TestCluster/ directory. This file contains the URLs and any information specific to that test cluster that may be used in query string parameters, post data, or headers. This file centralizes the point of control for any URL or parameter changes. Again, there are separate values for each domain authority. An example of a Longhaul test cluster is shown below as EXAMPLE 8.

EXAMPLE 8

```
– <TestCluster>
    <ClusterName>longhaul</ClusterName>
  – <Passport>
        <DomainName>passport.com</DomainName>
    – <URLs>
          <LoginDotCom>lhlogin.com.pp.test.microsoft.com</LoginDotCom>
          <LoginDotNet>uilhlogin.net.pp.test.microsoft.com</LoginDotNet>
          <RegDotCom>lhreg.com.pp.test.microsoft.com</RegDotCom>
          <RegDotNet>uilhreg.net.pp.test.microsoft.com</RegDotNet>
          <MemServDotCom>lhmemserv.com.pp.test.microsoft.com</MemServDotCom>
          <MemSErvDotNet>uilhmemserv.net.pp.test.microsoft.com</MemServDotNet>
          <AssocDotNet>lhassociation.net.pp.test.microsoft.com</AssocDotNet>
          <ConsenstDotNet>lhconsent.net.pp.test.microsoft.com</ConsentDotNet>
          <DelegAdminDotCom>lhdelegadmin.com.pp.test.microsoft.com</DelegAdminDotCom>
          <HipDotNet>lhhip.net.pp.test.microsoft.com</HipDotNet>
          <KidsDotNet>lhkids.net.pp.test.microsoft.com</kidsDotNet>
```

-continued

```
        <PPSettingsDotNet>lhppsettings.net.pp.test.microsoft.com</PPSettingsDotNet>
        <Partner2>lh2.ptpartner2.test.microsoft.com</Partner2>
    </URLs>
    <QSParams Name="id">10</QSParams>
    <QSParams Name="da">passport.com</QSParams>
    <QSParams Name="partnerid">2001</QSParams>
    <PostData Name="domain">passport.com</PostData>
    <PostData Name="id>3</PostData>
    <PostData Name="lc">1033</PostData>
    <DAdminPartnerKey>Dk8wnBxv3LCpCPGkJqxNTLwks!Bib5tA</DAdminPartnerKey>
    <DAdminPartnerKeyVersion>1</DAdminPartnerKeyVersion>
    <NSO_Domain>delegateadmin.com</NSO_Domain>
    <NSO_Admin>Fnsoadmin5@delegateadmin.com</NSO_Admin>
    <AdminTicket>1ud6jm!
      WODfm8H9V5XLZ2hQlb6nnGgyyXJEES93a2bJNWABeyBOyrSpMS1vojLpM3OmuQwO8BM41N!
      VR9hV8YuWw$$</AdminTicket>
  </Passport>
 + <MSN>
 + <Hotmail>
</TestCluster>
```

Continual updates to these test cluster files throughout the test cycle is unnecessary. This saves time and resources.

Test Cases

Each test case has a .vbs driver script which is run from the ACT User Interface. The .vbs driver script is generic but points to a test case XML file defining the unique request and response steps for that test case. The request steps comprise a data structure containing a request verb, URL, path, and input parameters. For example, PostLogin.vbs uses the test case XML file PostLogin.xml (see EXAMPLE 1 above). In EXAMPLE 1 above, the test case comprises 1 POST request using SSL to the passport login dot com server with the path /ppsecure/post.srf. It contains 5 query string parameters which are assembled as name=value pairs at runtime, 5 post data parameters which are sent as part of the request body, and 2 headers which are sent in the request header. It is also contemplated that test cases may comprise a series of GET and POST requests. These test case XMLs would contain multiple request/response nodes.

In general, the data structure for the XML test case is for use by the driver 102 for interpreting the XML test case from generator 104 or user input 105 into an http request to be sent to test a web location including a web site 106A-106N or a web service 108A-108N. Thus, the request data structure comprises the elements of the corresponding http request such as URL, path, query string parameters, post data, http headers, verb, etc.

Registry Keys

The root directory for ACTScripts on the client machine is defined in a registry key. This must be set before running any ACT tests. The registry keys are applied in the file FEPerf/FEPerf.reg.

Example Basic Test Scenario

To create a new test case, open an existing or new ACT project. Right-click on Tests and select "New Test . . . ". Create an empty test, choose dynamic test, and then enter the name of the test case in the field. Select the test case just created. The field to the right is where the user can begin entering VBScript code for the driver .vbs file; However, it suffices to take an existing driver .vbs file and copy and paste the code into the field for modification. Only some of the values need to be changed. For "g_sTestDomain", choose either "Passport", "EASI", "MSN", or "Hotmail". (This corresponds to the username configuration in TestSettings.xml; See EXAMPLE 7 <DA Name=""/>node). "g_sFileTestCaseXML" references the test case .xml file (this should have the same name as the test case with ".xml" as the extension), and "g_sFileRandomXML" which references the file of random parameter values (set g_sFileRandomXML=" " if not used).

Figure 4:
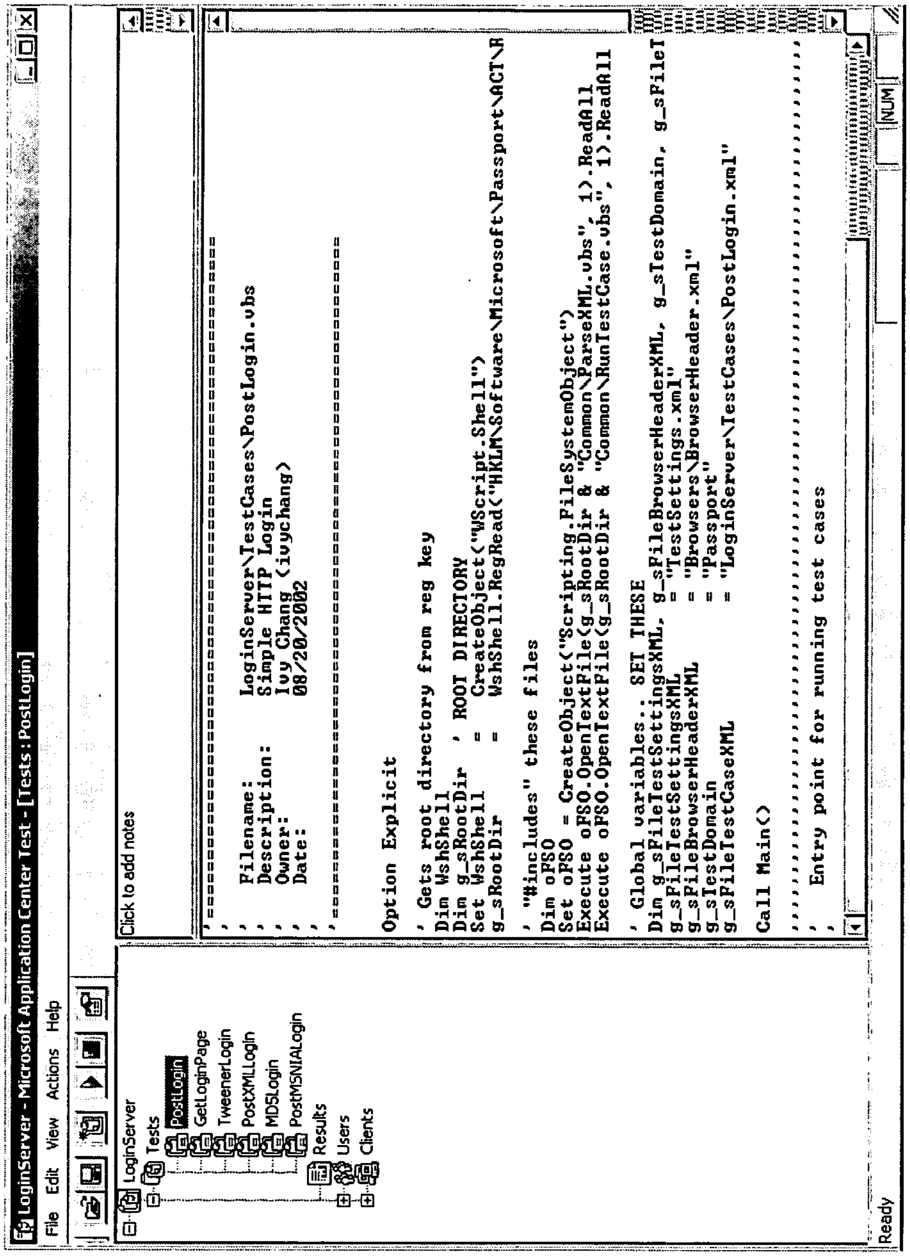
FIG. 4 is an exemplary embodiment of a screen shot of a user interface for executing a test case.

Once the test case XML file is in place, a test can be started by selecting the test case and clicking the green start button (or equivalently, right click on the test case and select start). In the test case properties (right click on the test case and choose properties), the number of "Simultaneous Browser Connections" can be changed to increase or decrease the stress load. In addition, the "Test Duration" can be set for a specified number of days, hours, minutes, and seconds (see FIG. 4).

Iterations

ACT tests may be run time-based or iterations-based. When ACT is set to run a time-based test, the test will stop after the specified time. When ACT is set to run an iterations-based test, ACT will run the test case script the number of times specified in the ACT iterations menu.

Each test case script does two things: 1) Parse the test case XML file for the test case data, and 2) send the requests specified in that data. Performance issues may arise when the test case XML must be parsed each time before the requests are sent. Thus, "TestCaseIterations" in the TestSettings.xml file specifies the number of times the requests are sent after parsing the XML. As an example, if <TestCaseIterations>1000</TestCaseIterations> and the ACT UI is set to run the test for 1 iteration, the following occurs: The test case XML file is parsed once, the set of requests are sent 1000 times. If <TestCaseIterations>1</TestCaseIterations> and the ACT Iterations in the UI is set to 1000, the following occurs: The test case XML file is parsed once, the set of requests are sent once. Repeat the above 1000 times.

At the beginning of each ACT Iteration, username generation restarts at "BaseName<StartUser>".

Trace File

For basic debugging, right-click on the name of the ACT project in the left column and select the "debugging" tab. Select "Enable logging of test runs" and choose a path. After starting a test case, an ACT_*.log file should appear containing information on the requests sent and the responses received as well as any parsing or runtime errors.

Extended Architecture

The basic architecture can be used to run single test cases for benchmark tests and stress tests using single scenarios. However, to run nightly stress testing and capacity planning tests, a combination of test cases can be run using the extended architecture. This includes two C# wrapper tools, Passport Nightly Stress and ACTRuntime, which use functions exposed by ACT's Project and Controller objects to run the designated test cases at configurable durations or iterations.

Passport Nightly Stress Tool

Figure 5:
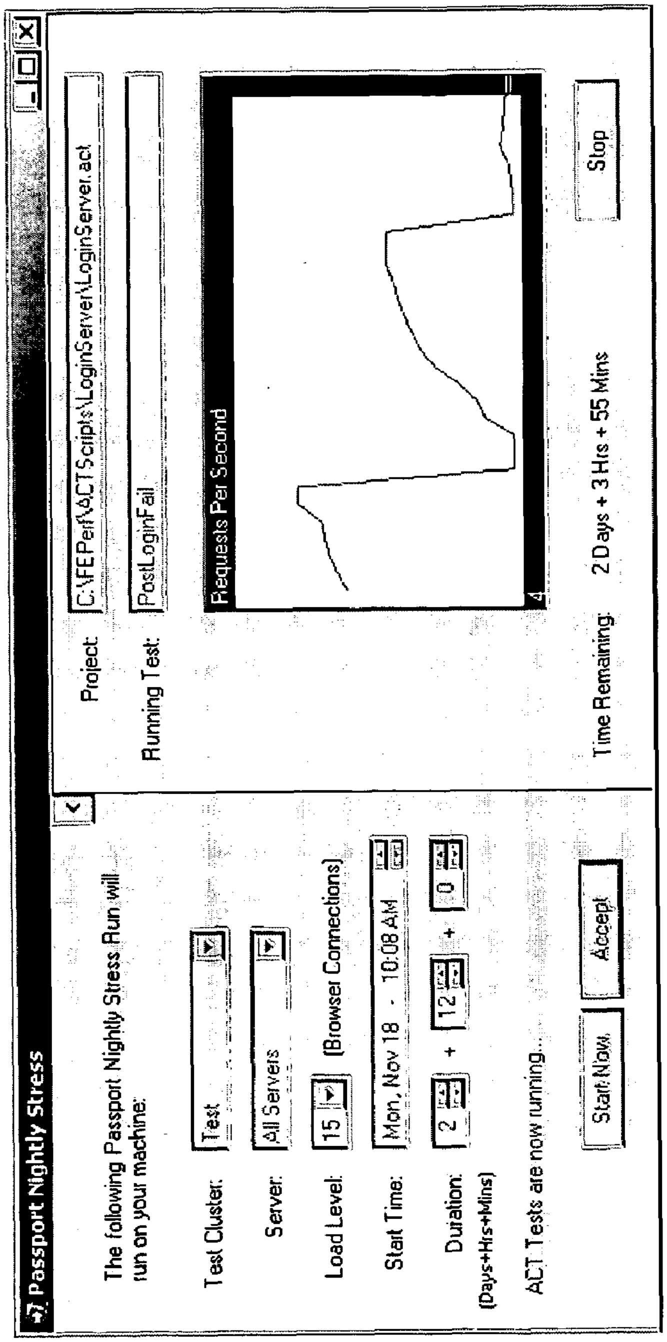
FIG. 5 is an exemplary embodiment of a screen shot of a user interface for invoking a Passport Nightly Stress tool that uses some aspects of the invention.

The Passport Nightly Stress tool is a C# WINDOWS® application which can be invoked by running Passport-NightlyStress.exe. An exemplary UI is illustrated in FIG. 5. From the UI, the user can select the Passport test web location to run the test on, the servers to stress, the test duration, load level, and a start time for the test.

The Passport Nightly Stress function cycles continuously through all of the tests in the server(s) selected and runs each test for a 10 second duration. The window on the right of FIG. 5 displays the runtime requests per second as the tests are running.

Some of the related tools for the Passport Nightly Stress function are the Passport Nightly Stress WINDOWS® Service, CleanupACT, and UpdateACTScripts.

ACT Runtime

The ACT Runtime is a C# console application which can be invoked from a command window:

>ACTRuntime.exe TestSettingsFile.xml TestSuiteFile.xml [Duration Minutes]

The TestSuiteFile is an XML file defining which test cases to run and at what running/failure/error percentages. For example, see FIG. 7A.

Figure 7A:
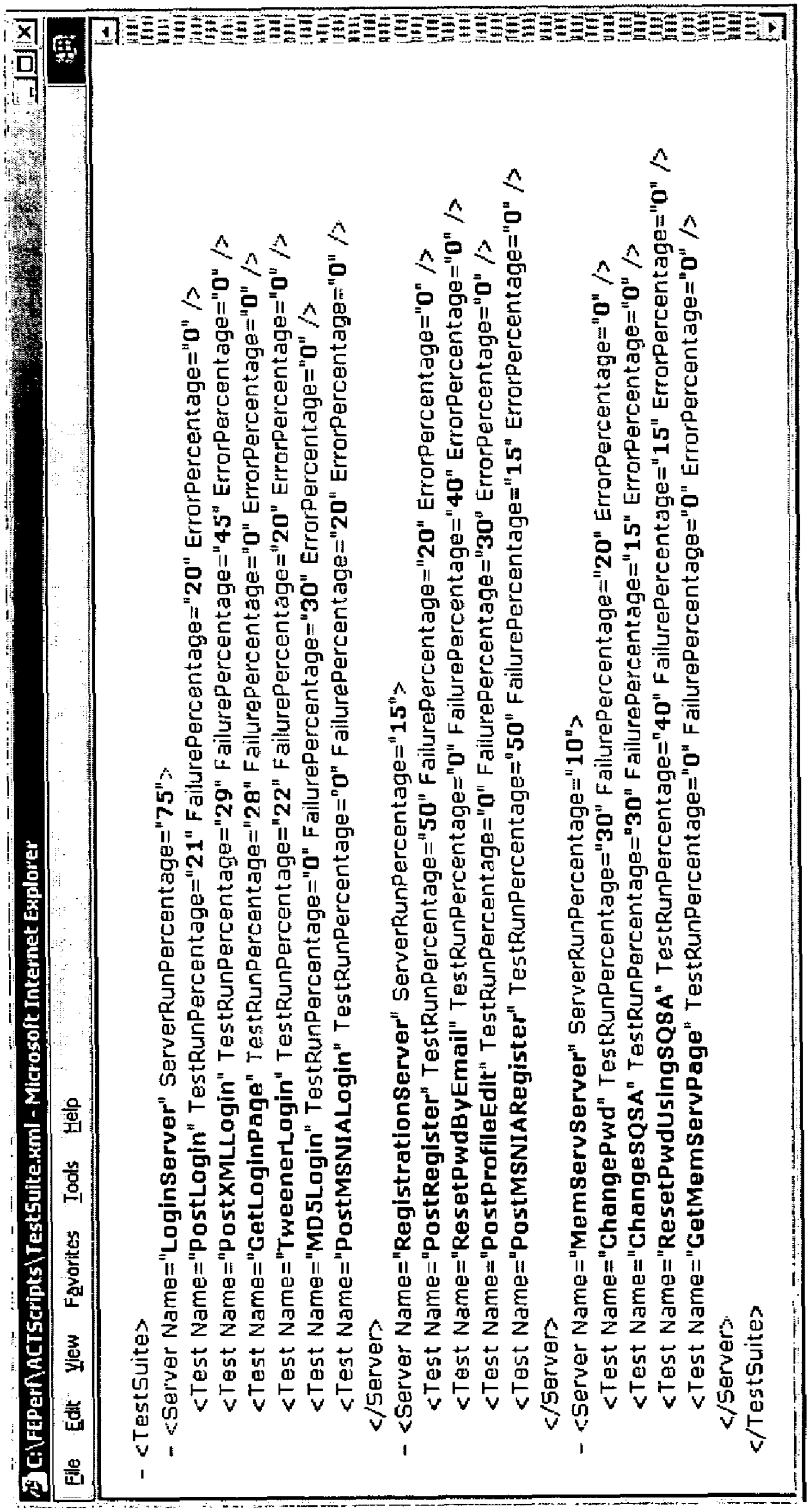
FIG. 7A is a screen shot of an example input to the ACT Runtime Engine, a C# console application, that uses one embodiment of the invention.

In FIG. 7A, Login test cases are run 75% of the time, Registration 15%, and MemServ 10%. Within Login test cases, 21% are PostLogin with 20% of these tests failing and 0% error cases. A failure test case is any test case named TestCaseFail*, and an error test case is any test case named TestCaseError*.

The ACTRuntime will run the test cases randomly in the percentages specified in the TestSuiteFile. Each time, the test case runs for 10 ACT Iterations times <TestCaseIterations> set in the TestSettingsFile. After [Duration Minutes] have passed, the test will stop. If no duration minutes are specified, the default of 2 weeks is used.

The number of ACT Iterations may be configurable.

Additional Optional Features

Test Case Generator

Figure 6:
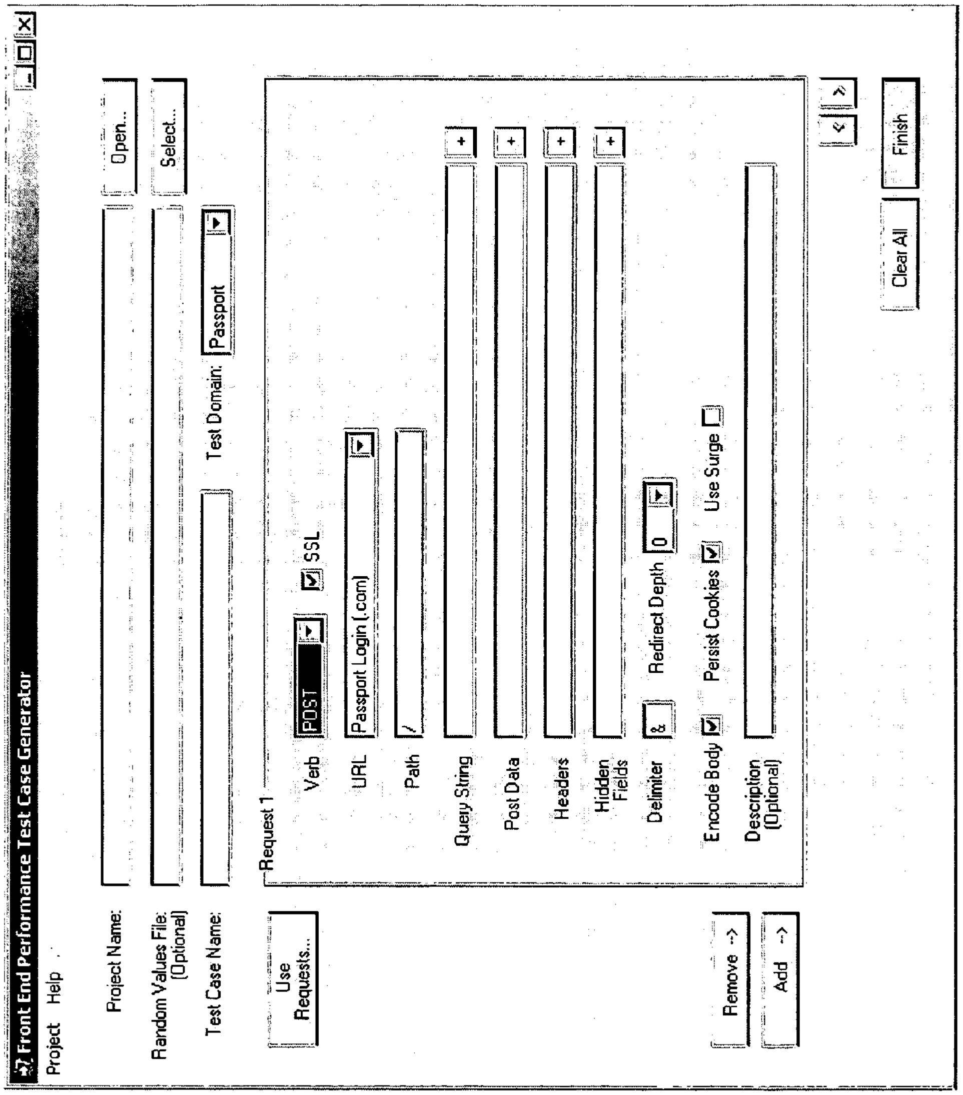
FIG. 6 is a screen shot of a user interface for a test case generator which is a tool that helps create test cases in XML format.

A C# WINDOWS® application may be provided to facilitate adding new test cases to a selected ACT project for the basic architecture. This front end performance test case generator (see FIG. 6) eliminates the manual steps of creating a driver .vbs script in ACT and creating the test case .xml file:

Results Reporting

ACT provides results reporting tools. It is contemplated that other relevant results may be gathered and/or displayed such as transactions per second, failures per second, etc.

What is claimed is:

1. A system for testing a web location including a web site or web service comprising a processor executing:

a test generator for generating an XML test case; and a driver for interpreting the XML test case into an http request to be sent to the web location, said driver comprising:

a parsing engine for parsing the XML test case into a sequence of requests/response pairs; and a runtime engine for providing to the web location the http request corresponding to the sequence of requests/response pairs wherein the runtime engine receives requests/response pairs from the parsing engine, and includes instructions for identifying dynamic data in the request/response pairs received from the parsing engine; instructions for evaluating the identified dynamic data for a result; instructions for replacing the evaluated result to generate a replaced request, wherein a tag value of the identified dynamic data is randomly replaced with at least one or more of the possible values listed under a node of an XML data file corresponding to the identified dynamic data.

2. The system of claim 1 wherein said runtime engine receives from the web location an http response corresponding to the http request and retrieves, validates, and stores data in the http response, said retrieved, validated, and stored data being indicative of an operational status of the web location.

3. The system of claim 2 wherein the parsing engine comprises:

instructions for identifying components in the XML test case wherein the XML test case is received from the test generator;

instructions for identifying configuration data of the components; and instructions for replacing the identified configuration data in the request to be sent to the web location to be tested.

4. The system of claim 2 wherein the parsing engine comprises:

instructions for identifying any sequence of request/response pairs in the XML test case received from the test generator or user input;

instructions for determining if each identified request is a simple request or a composite of other requests and for reducing a composite request to a plurality of simple requests;

for each simple request/response pair, instructions for identifying a data structure of the simple request/response pair;

instructions for identifying aspects of the request data structure which include configuration data; and instructions for replacing the identified configuration data in the request to be sent to the web location to be tested and outputting the resulting sequence of request/response pairs.

5. The system of claim 4 wherein the data structure includes the elements of an http request including the following: a URL, a path, query string parameters, post data, and a verb.

6. The system of claim 4 wherein the runtime engine comprises:

instructions for identifying dynamic data in the request/response pairs received from the parsing engine;

instructions for replacing the identified dynamic data to generate a replaced request;

instructions for creating an http request from the data in the replaced request;

instructions for instantiating an http engine; and instructions for sending the http request to the web location.

7. The system of claim 6 further comprising:

instructions for receiving from the web location an http response to the corresponding http request;

instructions for identifying the location and data to be retrieved from the http response regarding the operability of the web location; and instructions for retrieving, validating, and storing the identified location and data.

8. The system of claim 1 wherein the runtime engine further comprises:

instructions for creating an http request from the data in the replaced request;

instructions for instantiating an http engine; and instructions for sending the http request to the web location.

9. The system of claim 8 further comprising:

instructions for receiving from the web location an http response to the corresponding http request;

instructions for identifying the location and data to be retrieved from the http response regarding the operability of the web location; and instructions for retrieving, validating, and storing the identified location and data.

10. The system of claim 1 wherein the test case includes at least one of the following tags: dynamic user names, parameters specific to the test case and retrieved from a configuration file corresponding to the web location, and optional tags.

11. The system of claim 1 further comprising instructions for at least one of the following: handling cookies, manipulating data, supporting XML parameters, sending hidden fields, inserting random parameters, and using use case attributes.

12. The system of claim 1 wherein the XML test case has a data structure comprising elements of an http request including the following: a URL, a path, query string parameters, post data, and a verb.

13. A method of testing a web location including a web site or web service comprising:

generating a test case in XML format;

interpreting the XML test case into a http request to be sent to the web location;

parsing the XML test case into a sequence of request/response pairs;

identifying dynamic data in the request/response pairs;

evaluating the identified dynamic data for a result;

replacing the evaluated result to generate a replaced request, wherein a tag value of the identified dynamic data is randomly replaced with at least one or more of the possible values listed under a node of an XML data file corresponding to the identified dynamic data; and providing to the web location the http request corresponding to the sequence of request/response pairs.

14. The method of claim 13 wherein the parsing comprises:

identifying components in the XML test case received from the test generator;

identifying configuration data of the components; and replacing the identified configuration data in the request to be sent to the web location to be tested.

15. The method of claim 13 wherein the parsing comprises:

identifying any sequence of request/response pairs in the XML test case received from the test generator or user input;

determining if each identified request is a simple request or a composite of other requests and for reducing a composite request to a plurality of simple requests;

for each simple request/response pair, identifying a data structure of the simple request/response pair;

identifying aspects of the request data structure which include configuration data; and replacing the identified configuration data in the request to be sent to the web location to be tested and outputting the resulting sequence of request/response pairs.

16. The method of claim 15 wherein the data structure includes the elements of an http request including the following: a URL, a path, query string parameters, post data, and a verb.

17. The method of claim 16 wherein providing to the web location the http request comprises:

identifying dynamic data in the request/response pairs received from the parsing engine;

replacing the identified dynamic data to generate a replaced request;

creating an http request from the data in the replaced request;

instantiating an http engine; and sending the http request to the web location.

18. The method of claim 17 further comprising:

receiving from the web location an http response to the corresponding http request;

identifying the location and data to be retrieved from the http response regarding the operability of the web location; and retrieving, validating, and storing the identified location and data.

19. The method of claim 13 wherein providing to the web location the http request comprises:

creating an http request from the data in the replaced request;

instantiating an http engine; and sending the http request to the web location.

20. The method of claim 19 further comprising:

receiving from the web location an http response to the corresponding http request;

identifying the location and data to be retrieved from the http response regarding the operability of the web location; and retrieving, validating, and storing the identified location and data.

21. The method of claim 13 further comprising receiving from the web location an http response corresponding to the http request and retrieving, validating and storing data from the http response wherein said retrieved, validated and stored data is indicative of an operational status of the web location.

22. The method of claim 13 wherein the test case includes at least one of the following tags: dynamic user names, parameters specific to the test case and retrieved from a configuration file corresponding to the test case, and optional tags.

23. The method of claim 13 further comprising at least of the following in conjunction with the generating of the XML test case: handling cookies, manipulating data, supporting XML parameter, sending hidden fields, inserting random parameters, and using use case attributes.

24. A method of testing a plurality of web locations connected by a multi-site user authentication system according to an XML test case comprising:

generating a specific XML test case associated with the web locations;

parsing the XML test case into a sequence of request/response pairs with a parsing engine; and sending each of the http requests to the corresponding web locations, said sending comprising:

receiving requests/response pairs from the parsing engine;

identifying dynamic data in the request/response pairs received from the parsing engine;

evaluating the identified dynamic data for a result; and replacing the evaluated result to generate a replaced request, wherein a tag value of the identified dynamic data is randomly replaced with at least one or more of the possible values listed under a node of an XML data file corresponding to the identified dynamic data.

25. The method of claim 24 further comprising receiving from each of the web locations an http response corresponding to the http request sent to the location and retrieving, validating, and storing data from the http response wherein said retrieved, validated, and stored data is indicative of an operational status of the web location.

26. The method of claim 24 wherein parsing the XML test case comprises:

identifying components in the XML test case received from the test generator;

identifying configuration data of the components; and replacing the identified configuration data in the request to be sent to the web location to be tested.

27. The method of claim 24 wherein parsing the XML test case comprises:

identifying any sequence of request/response pairs in the XML test case received from the test generator or user input;

determining if each identified request is a simple request or a composite of other requests and for reducing a composite request to a plurality of simple requests;

for each simple request/response pair, identifying a data structure of the simple request/response pair;

identifying aspects of the request data structure which include configuration data; and replacing the identified configuration data in the request to be sent to the web location to be tested and outputting the resulting sequence of request/response pairs.

28. The method of claim 27 wherein the data structure includes the elements of an http request including the following: a URL, a path, query string parameters, post data, and a verb.

29. The method of claim 24 wherein sending each of the http requests comprises:

creating an http request from the data in the replaced request;

instantiating an http engine; and sending the http request to the web location.

30. The method of claim 29 further comprising:

receiving from the web location an http response to the corresponding http request;

identifying the location and data to be retrieved from the http response regarding the operability of the web location; and retrieving, validating, and storing the identified location and data.

31. A computer readable medium (CRM) having instructions for testing a web location including a web site or web service comprising:

instructions for generating an XML test case; and instructions for interpreting the XML test case into an http request to be sent to the web location, said instructions for interpreting comprising:

instructions for parsing the XML test case into a sequence of request/response pairs with a parsing engine;

instructions for receiving the requests/response pairs from the parsing engine;

instructions for identifying dynamic data in the request/response pairs received from the parsing engine;

instructions for evaluating the identified dynamic data for a result; and instructions for replacing the evaluated result to generate a replaced request, wherein a tag value of the identified dynamic data is randomly replaced with at least one or more of the possible values listed under a node of an XML data file corresponding to the identified dynamic data.

32. The CRM of claim 31 further comprising:

instructions for providing to the web location the http request corresponding to the sequence of requests/response pairs.

33. The CRM of claim 31 further comprising instructions for receiving from the web location an http response corresponding to the http request and instructions for retrieving, validating, and storing data from the http response wherein said retrieved, validated, and stored data is indicative of an operational status of the web location.

34. The CRM of claim 31 wherein the test case includes at least one of the following tags: dynamic user names, parameters specific to the test case and retrieved from a configuration file corresponding to the test case, and optional tags.

35. The CRM of claim 31 further comprising at least one of the following in conjunction with the instructions for generating of the XML test case: instructions for handling cookies, instructions for manipulating data, instructions for supporting XML parameter, instructions for sending hidden fields, instructions for inserting random parameters, and instructions for using use case attributes.

* * * * *